Figure 1:
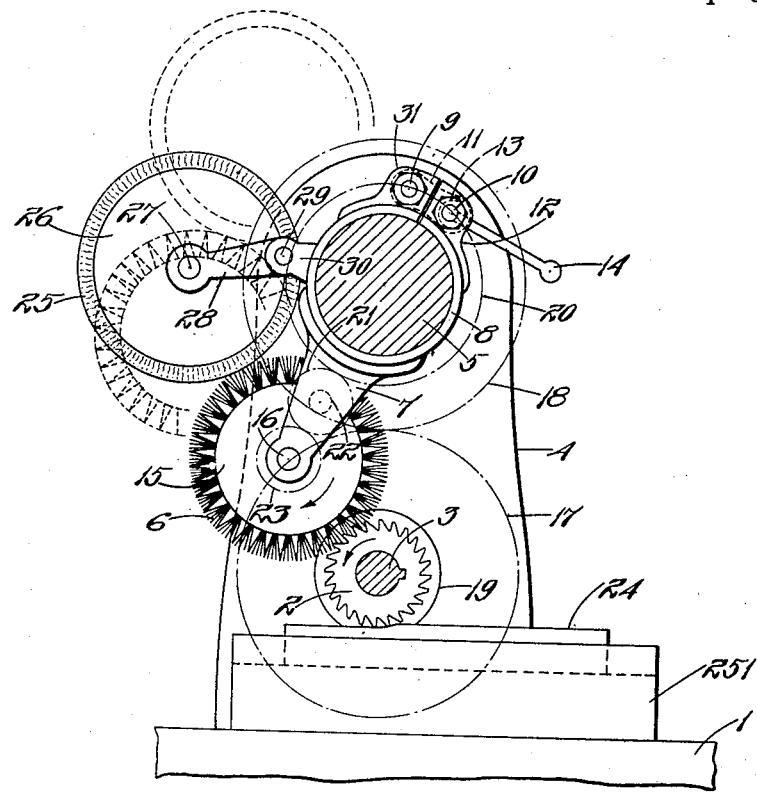

T. B. KINRAIDE.
APPARATUS FOR FORMING A SMOOTH SURFACE ON METAL WHILE BEING MILLED.
APPLICATION FILED MAY 13, 1918.

1,336,239. Patented Apr. 6, 1920.

INVENTOR:
Thomas B. Kinraide
by Macleod, Calver, Copeland & Dike
Attys.

UNITED STATES PATENT OFFICE.

THOMAS B. KINRAIDE, OF BOSTON, MASSACHUSETTS.

APPARATUS FOR FORMING A SMOOTH SURFACE ON METAL WHILE BEING MILLED.

1,336,239.

Specification of Letters Patent.

Patented Apr. 6, 1920.

Application filed May 13, 1918. Serial No. 234,260.

*To all whom it may concern:*

Be it known that I, THOMAS B. KINRAIDE, a citizen of the United States, residing at Boston, county of Suffolk, State of Massachusetts, have invented a certain new and useful Improvement in Apparatus for Forming a Smooth Surface on Metal while being Milled, of which the following is a specification, reference being had therein to the accompanying drawings.

In the use of machines for milling down the surface of metallic bars or thinning down the bars to bring them to the requisite thickness, that is, surfacing them, as it is termed in the trade by the use of milling cutters, and of other cutters, it is well known that the chips formed by the cutter adhere to the cutting edges of the blades or teeth more or less, thus absolutely preventing a perfectly smooth surface being formed on the bar which is being worked, and in fact often times after a few turns of the cutter the chips accumulate so that by reason of their burring effect on the surface of the bar while the cutter is in operation, the surface of the bar becomes very much roughened. The softer the metal of the bar which is being worked, the rougher will be the surface after the cutter has been over it. This is noticeable to some extent in steel bars but it is especially noticeable in the softer metals such as aluminum, copper and lead. In copper and lead it is true to a very marked degree.

In many kinds of construction where metal bars are employed, it is extremely important, in fact absolutely necessary, that the surfaces shall be very smooth, for instance in the construction of crank cases for automobiles where it is important that the joints shall be very tight, the overlapping surfaces at their joints should be very smooth. It is also essential in aeroplane construction where aluminum is used to a considerable extent.

One object of the present invention is to provide a method of thinning down a metallic bar or plate and at the same operation forming a smooth surface on the face of the metal, said method consisting of surfacing the bar or plate by a cutter and clearing the cutting edge of the cutter automatically each time that the cutting edge passes out of contact with the metal plate before it again comes into operative contact with the plate.

Another object of the present invention is to provide an attachment for a milling machine which can be readily attached to the milling machines in ordinary use to automatically free the cutting edges of the blades of the milling cutter from the chips as fast as they are formed. Another object of the invention is to provide means for connecting the attachment with the milling machine in such manner that the cleaning device may be adjusted when desired, either in an operative position with relation to the milling cutter or out of operative position as desired.

The invention will be fully understood from the following description when taken in connection with the accompanying drawings and the novel features thereof will be pointed out and clearly defined in the claims at the close of this specification.

In the drawings, Figure 1 is a view in elevation, partly in section, of a portion of a milling machine, having attached thereto one form of a device embodying the invention.

Figure 2:
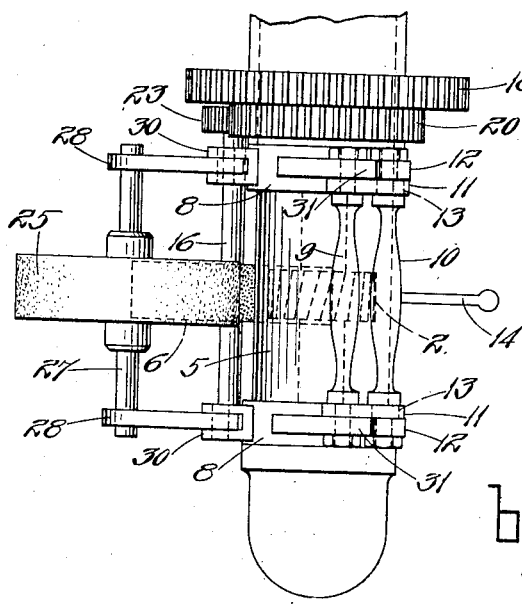

Fig. 2 is a plan view of a portion of the top of the milling machine and the attachment embodying the invention.

Referring now to the drawings, 1 is a platen of a milling machine, partly broken away, the lower portion of the machine being omitted. A milling cutter 2 is mounted on an arbor 3 which is journaled in the column or arbor support 4. The arbor 3 is driven by any suitable mechanism. A horizontal arm 5 is mounted on the upper part of the arbor support 4, and mounted on said arm 5 is a yoke or hanger in which is journaled a rotary brush 6. In the form of device shown in the drawings, the hanger in which the brush 6 is journaled comprises two depending arms 7 parallel with each other which are respectively provided at their upper ends with straps 8 which encircle the arm 5, each of said straps being split transversely so that the strap may be spread open somewhat to permit its adjustment on the arm 5. Each strap has a boss 31 on the outer periphery near one end, which is connected with the boss on the corresponding end of the other strap by a tie rod 9, and the other ends of the two straps are connected together by a tie rod 10 which is journaled in the two bosses 12, 12 on the outer periphery of the two straps near the said other ends. The two tie rods are connected together by links 11, 11. An eccentric 13 is carried by the rod 10 at each end thereof. The rod 10 is provided with a lever arm 14 whereby said arm may be rotated. By rotating the said rod 10 the eccentrics 13, 13 are rotated in a manner to close or open the straps 8, 8 according to the direction of rotation of the eccentric, thereby causing the straps to grip or loosen their hold as the case may be on the arm 5. The straps are loosened for the purpose of permitting adjustment of the hanger on the arm 5 and are tightened again to clamp the hanger in its adjusted position. When the straps are loosened the hanger may be turned on the arm so as to swing the brush up out of contact with the cutter, as shown in dotted lines in Fig. 1, and the straps may then be tightened to hold the brush in the said inoperative position.

The brush 6 is preferably a bristle brush of cylindrical form, the tufts of the bristles being set into a cylindrical head 15 which is mounted fast on a shaft 16. The bristles are preferably short and stiff. Said shaft 16 is journaled in the depending arms 7 of the hanger.

By properly adjusting the hanger radially on the arm 5 the brush may be positioned so that the bristles will engage with the blades of the milling cutter 2 as shown in Fig. 1.

For the purpose of cleaning the blades of the cutter 2 the brush 6 should be rotated continuously when the cutter 2 is being rotated, and it is important that it should be driven in a direction so that the bristles of the brush will engage particularly with the cutting edges of the blades of the cutter, hence they should be rotated so that the travel of the blades and of the bristles of the brush will be in the same direction when they are in contact with each other, but at different speeds. It is preferable to have the brush travel faster than the cutter. Any suitable means of accomplishing this result may be employed. The means shown are as follows:

Mounted on the end of the spindle 19 which carries the cutter arbor 3 is a driving gear 17 which engages with a gear 18 mounted on the arm 5, the said two gears 17 and 18 being as one to one. Mounted fast on arm 5 is a gear 20 of smaller diameter than the gear 18. As shown in the drawings, gear 20 is formed integral with the gear 18. Said gear 20 engages with an idler 21 mounted on a stud 22 carried in one of the arms 7 and said idler engages with a gear 23 mounted on the brush shaft 16. The gears 20 and 23 are shown as proportioned three to one, so that the brush will make three revolutions while the cutter 2 makes one revolution. It will thus be seen that when the parts are adjusted as in Fig. 1, during the rotation of the milling cutter the brush will be constantly traveling at a greater rate of speed than the cutter and will be operative on the front or cutting edges of the blades of the cutter 2 and thoroughly clean the cutting edges of the blades from the chips of the metal which may be cut away from the surface of the bar which is being milled. The bristles being short and stiff and the cutter constantly turning its blades into the ends of these bristles, this causes a powerful thrust upon the particles of metal adhering to the blade so that the brush has two functions, it not only acts as a brush to wipe the particles from the blades, but it also acts as a matting tool upon the adhering particles and thrusts them away from the cutting edge. The drawing shows a bar 24 mounted on the feed block 251 in the process of being milled.

I have found that the chips or fine particles of metal which are cut from the bar which is being operated upon are less likely to adhere to the cutter, or if they do adhere to the cutter, they are more easily brushed away, if the blades of the cutter are kept oiled. Inasmuch as it is not desired to have a large amount of oil on the cutter at any time, but rather to keep the blades slightly oiled all of the time, I have found it productive of good results to keep the brush 6 oiled and to oil the blades by means of the brush 6 at the same time that the brush cleans the blades. In order to keep the brush 6 constantly oiled without dripping I provide an oiling roll which is of the same width as the brush and against which the brush will contact during its rotation.

This oiling roll is preferably a pad of felt 25 or other equivalent material mounted on the periphery of a wooden core 26. The said roll is mounted loosely on a shaft 27 so as to be rotatable thereon. Said shaft 27 is mounted fast in the arms 28 which are pivotally connected at 29 with arms 30 which project from the outer periphery of the straps 8 of the hanger which carries the brush. By reason of the pivot connection of the arms 28 with the straps 8 the oiler roll 25 will when the device is mounted as shown in Fig. 1, drop by gravity into contact with the brush roll 6.

The pad 25 is sufficiently saturated with oil so that as the brush in its rotation engages the periphery of the oil pad the bristles of the brush will be constantly reoiled.

The oil roll need not have any independent means for rotating the same but it will be caused to rotate by its frictional contact with the brush so that all portions of the periphery of the oil roll will successively be brought into operative contact with the brush.

While I have described one form of attachment for a milling machine whereby the blades of the cutter are cleaned automatically during the rotation of the cutter, I do not intend to limit the claims to the particular form of mechanism shown, said mechanism being illustrative of one form of means for cleaning the blades. My invention resides broadly in the idea of automatically cleaning the cutting edges of the blades during the movement of the cutter after each operative contact of a blade before it again comes into operative engagement with the metal which is being milled, or in other words, it resides broadly in the method of cutting down the surface of a metal plate in such manner as to constantly leave a smooth surface where it is milled down, said method consisting of removing the metal from the surface by a cutter and cleaning the cutting edge of each blade automatically each time after it leaves the metal before it again comes into contact with the metal.

What I claim is:

1. In combination with a milling machine having a rotary cutter, a rotary bristle brush whose axis extends parallel with the axis of the cutter, a yoke in which said brush is journaled, a supporting shaft parallel with the axis of said brush, means for adjustably securing said yoke to said shaft to maintain the brush parallel with the axis of the cutter, the yoke being adjustable to change the position of the brush toward and away from the cutter, and means for maintaining the yoke in its adjusted position, so that the brush may be maintained either in engagement with the cutter or entirely free from the cutter, as desired.

2. In combination with a milling machine having a rotary cutter, a rotary brush whose axis is parallel with the axis of the cutter, a mount in which said brush is journaled, so located that the brush engages with the cutter during the rotation, and a rotary oiling roll which engages with the periphery of the brush throughout the length of the brush, and bears with a pressure on said brush.

3. In combination with a milling machine having a rotary milling cutter, a rotary brush whose axis extends parallel with the axis of the cutter, and means for supporting said brush in relation to the said cutter, said supporting means comprising a shaft which extends parallel with the axis of the brush and of the cutter, a strap adjustably secured to said shaft, an arm projecting from said strap and having bearings in which said brush is journaled, said strap being adjustable on said shaft whereby the bearing for the brush is radially adjustable to vary the position of the brush with relation to the cutter.

4. In combination with a milling machine having a rotary milling cutter, a rotary brush whose axis extends parallel with the axis of the cutter, and means for supporting said brush in relation to the said cutter, said supporting means comprising a shaft which extends parallel with the axis of the brush and of the cutter, a strap adjustably secured to said shaft, an arm projecting from said strap and having bearings in which said brush is journaled, said strap being adjustable on said shaft whereby the bearing for the brush is radially adjustable to vary the position of the brush with relation to the cutter, an oiling roll and an arm projecting from said strap with which said oiling roll is pivotally connected in such manner that the oiling roll bears upon the periphery of said brush.

5. In combination with a milling machine having a rotary milling cutter, a rotary brush located in position to engage the blades of the cutter during the rotation, and an adjustable mount for the brush, said mount being adjustable to bring the brush into position to engage the blades of the cutter and to shift the brush out of engaging position, and means for maintaining the mount with the brush in the adjusted position, either in engagement with the cutter or entirely free from engaging position with the cutter, as desired.

6. In combination with a machine having a rotary milling cutter, a rotary brush, means for holding the brush so that it may at will be located in position to engage the blades of the cutter during the rotation or in a position where it will be out of engagement with the cutter, and means for maintaining the brush in the adjusted position, either in engaging position with the cutter or entirely out of engaging position as desired.

7. In combination with a milling machine having a rotary milling cutter, a brush which extends alongside of the cutter its full length, means for holding the brush in a position to engage the blades of the cutter during the rotation, means for rotating both the brush and the cutter, and a rotary oiling member which engages with the brush throughout the entire length of the brush and thereby applies oil to the brush as the brush and oiling member rotate in engagement with each other.

8. In combination with a milling machine having a rotary milling cutter, a rotary bristle brush, means for holding the brush in a position to engage the blades of the cutter during the rotation, means for rotating the cutter and the brush, and means for automatically applying oil to the said brush during the rotation.

9. In combination with a milling machine having a rotary cutter, a rotary bristle brush, means for holding the brush in a position to engage the blades of the cutter during the rotation, means for rotating the cutter and the brush, a second rotary member located in position to engage said bristle brush, said second rotary member being provided with an oil pad on its periphery whereby it maintains the ends of the bristles of said first brush in an oily state.

In testimony whereof I affix my signature.

THOMAS B. KINRAIDE.